Aug. 25, 1964    C. K. KROELL    3,146,014
ENERGY ABSORBING VEHICLE BUMPER ASSEMBLY
Filed Aug. 12, 1959    2 Sheets-Sheet 1

INVENTOR
Charles K. Kroell
BY
S. C. Thorpe
ATTORNEY

Aug. 25, 1964   C. K. KROELL   3,146,014
ENERGY ABSORBING VEHICLE BUMPER ASSEMBLY
Filed Aug. 12, 1959   2 Sheets-Sheet 2

INVENTOR
Charles K. Kroell
BY
S. C. Thorpe
ATTORNEY

3,146,014
ENERGY ABSORBING VEHICLE BUMPER ASSEMBLY
Charles K. Kroell, Royal Oak, Mich., assignor to General Motors Corporation, Detroit, Mich., a corporation of Delaware
Filed Aug. 12, 1959, Ser. No. 833,168
5 Claims. (Cl. 293—70)

This invention relates to devices for absorbing energy of impact forces, for example, those associated with automotive vehicle bumpers, crash pads, etc.

The invention has as its principal object to provide an improved device of this type for absorbing energy through telescoping a tubular member axially of itself, whereby the side walls of the tube are progressively flexed or bent radially and then in a reverse axial direction along the length of the tube. Such initial bending and restraightening of the tube side walls effects a double working of the material with consequent efficient energy absorption in terms of the length of displacement of the tube ends relative to each other. The absorption device in accordance with the invention has important advantages over others previously proposed in being relatively inexpensive to manufacture and impervious to corrosion damage in service, and in requiring no lubrication.

These and other objects and advantages of the invention will be readily understood from the following description of two illustrative embodiments thereof, having reference to the drawings, wherein.

Figure 1:
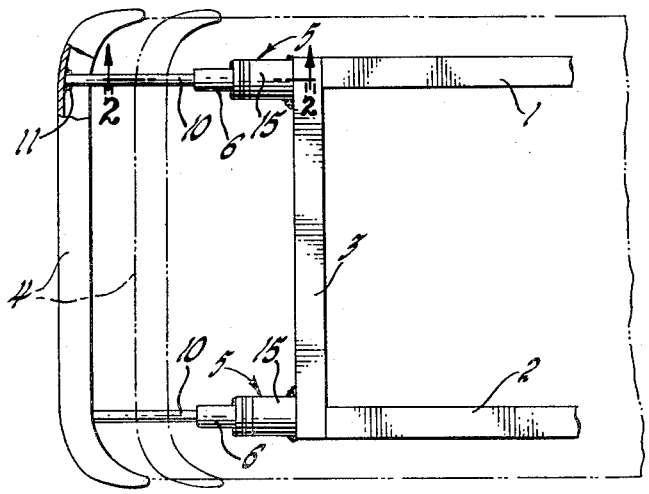
FIGURE 1 is a plan view illustrating the application of the improved energy absorber as a mounting between a vehicle frame and its protective bumper.
Figure 2:
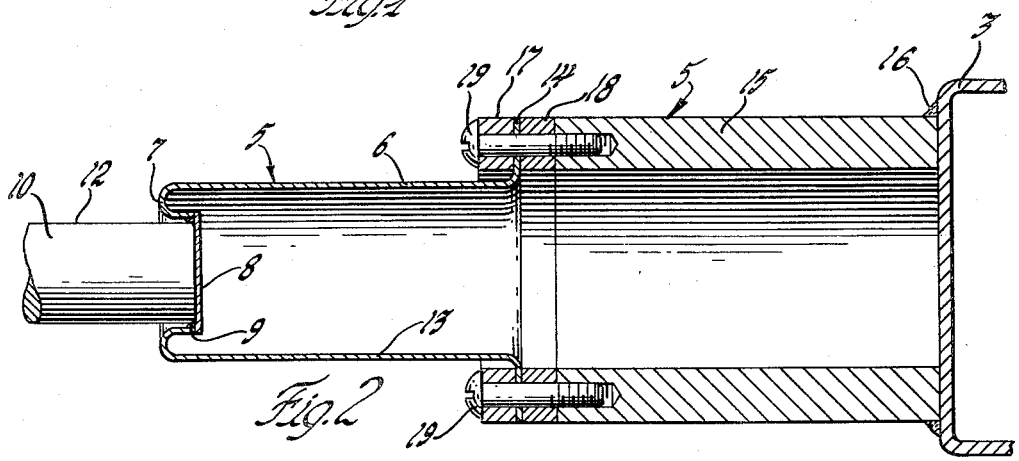
FIGURE 2 is an enlarged sectional view taken substantially on line 2—2 of FIGURE 1, showing the parts of the absorber in greater detail, and in their relation prior to or during the initial stage of an energy absorption stroke.
Figure 3:
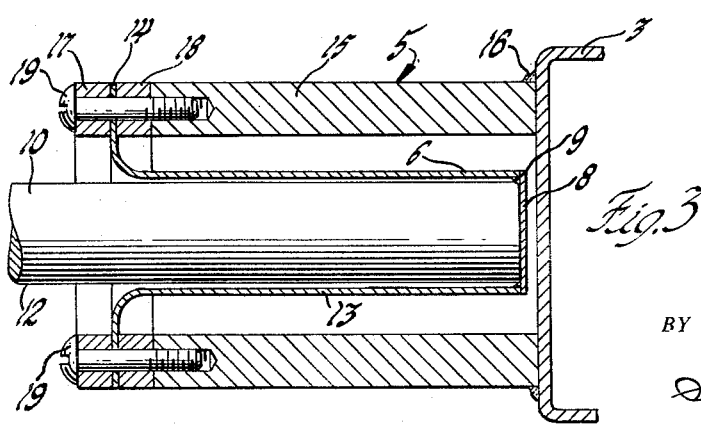
FIGURE 3 is a view of the same device shown in FIGURE 2, but with the parts in their relative positions at the end of an absorption stroke.

Referring now in detail to the drawings, and first to FIGURES 1-3, there is shown a vehicle frame including side rails 1 and 2 joined together at one end by a cross brace 3. Arranged in protective spaced relation to the frame is a conventional vehicle bumper 4, shown in solid lines in its normal position prior to receiving an impact force (such as from a vehicle collision), and shown in broken lines at its displaced position following impact. Disposed endwise between the bumper 4 and the frame cross bar 3 are a pair of the improved energy absorbers in laterally spaced relation and designated generally by the numeral 5. As they are identical, only one thereof requires description. As best shown in FIGURES 2 and 3, the absorber comprises a tube 6 of ductile material, preferably metal, and which is of circular cross section. One end of the tube is flanged radially inward thereof as indicated at 7. Connected to extend coaxially from this flanged end, as by a plate 8 welded at 9, is a bumper attaching member 10, shown in the form of a rod whose opposite end may be fixed in any desired manner as by welding at 11 to the bumper 4. As shown, the rod member 10 is cylindrical and presents an annular surface 12 which is of substantially smaller diameter than the radially opposite facing inner surface 13 of the tube 6. Supporting and connected to the opposite end of the tube 6, as by the external flange 14 thereof, is a coaxially extending reaction member 15 having its opposite end fixed to the frame cross brace 3 as by welding at 16. The reaction member 15 is preferably made hollow and of sufficiently large internal diameter to provide a chamber in which to receive the reversely bent portion of the tube 6 as it is progressively developed axially toward the member 15 in absorbing impact forces received by the bumper 4. The tube is shown in FIGURE 3 at the extreme limit of such progressive energy absorbing stroke, at which the rod member 10 extends substantially the full length within the tube 6 and both are received within the reaction member 15. The connection between the member 15 and the tube flange 14 is ilustrated as effected by clamping the flange 14 between two annular rings 17 and 18 and securing both thereof rigidly to the end of the member 15 by cap screws 19.

Figure 4:
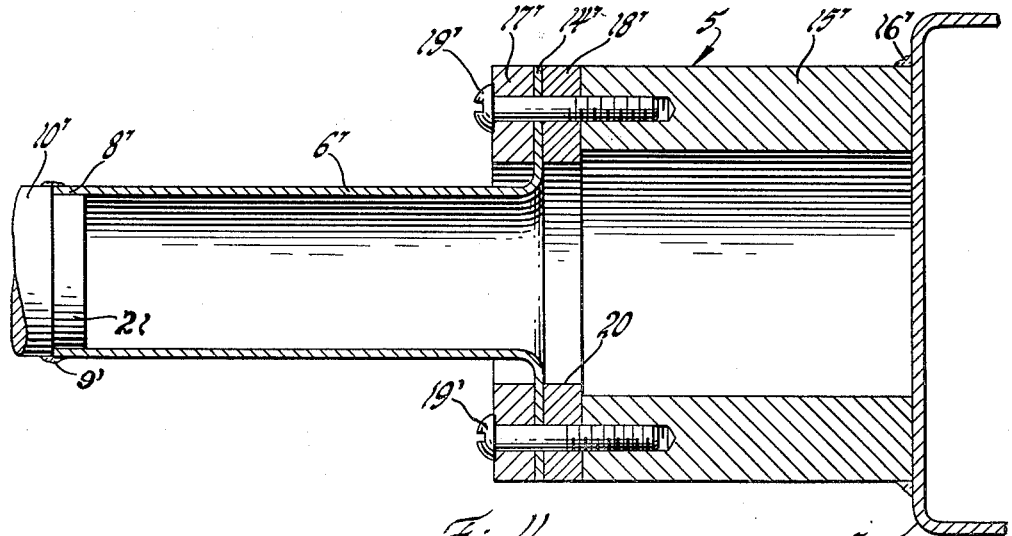
FIGURES 4 and 5 are views similar to FIGURES 2 and 3, respectively, but showing a modified form of the device.
Figure 5:
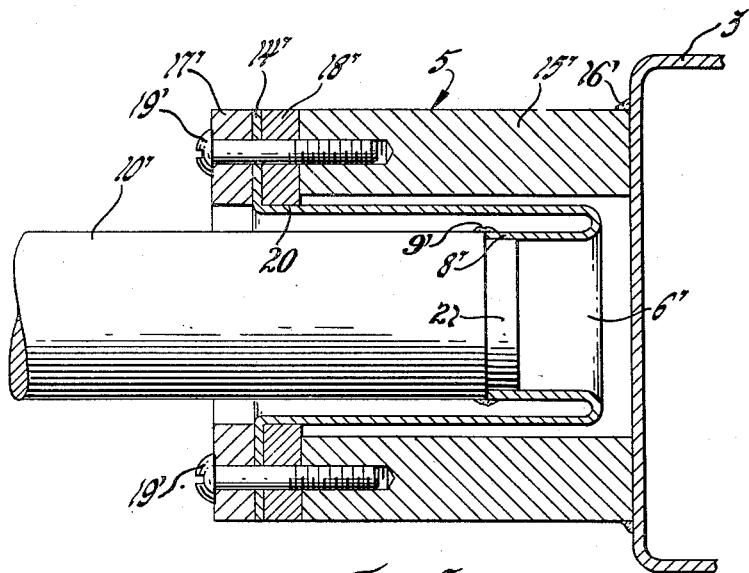

In the modified form of the device shown in FIGURES 4 and 5, the reaction member 15' and clamping rings 17', 18' are all of larger internal diameter relative to the tube 6' and clampingly engage the external flange 14' of the tube at a greater distance radially from the tube axis than in the embodiment previously described. The reaction member 15' is fixed to the frame cross brace 3, as by welding at 16'; and cap screws 19' secure the rings 17' and 18', with flange 14' clamped therebetween, to member 15'. Also in this modified embodiment the bumper mounting member or rod 10' is secured in direct axial abutting relation with the energy receiving end 8' of the tube. In other words, there is no radial flange (either inward, as at 7 in FIG. 2, or outward) connecting the tube 6' to the rod 10'. To effect a suitable connection with the tube, the rod 10' may be welded thereto as shown at 9', and have a reduced diameter end portion 21 closely fitting within the end 8' of the tube. The radial spacing between the annular internal wall surface 20 of the ring 18' and the oppositely facing exterior surface of the tube 6' is sufficient to accommodate reverse bending of the tube. In other words, this radial spacing determines the effective bendable width of the flange 14'; and by making this width great enough in relation to its thickness and the stiffness of the material of tube 6', such bending will occur under a thrust load below that which would cause the tube to buckle or columnate. This bending begins in the section of the flange 14' by folding it over against the ring internal surface 20. Obviously, it is not necessary to the initiation of such bending at this end of the tube 6' that the opposite end 8' thereof receive any reduced end 21 or be welded to the rod 10'. All that is essential is that the connection between the rod 10' and the tube end 8' maintain them in axial alignment and prevent such reverse bending as occurs at that end in the embodiment of FIGURES 2 and 3. Continued movement of the rod 10' toward the position indicated in FIGURE 5 causes progressive flexing or bending of the tube wall in first a radially outward direction, followed by a restraightening thereof as a section of larger diameter than that of the initially formed tube.

The energy absorption taking place in the first described embodiment of FIGURES 2 and 3 differs from that of FIGURES 4 and 5 in that compression of the tube structure accompanies the bending action in the former, whereas such bending is accompanied by stretching of the tube structure in the latter case. Since the entire length of the tube in each embodiment is subjected to its same respective pattern of deformation throughout the duration of the stroke, the resisting load will likewise remain constant in shape (as shown). In either case, a tube such as described, made of soft aluminum or copper and having a diameter of approximately 1½ inches and wall thickness of approximately $\frac{1}{32}$ of an inch, will perform satisfactorily for the purpose without columnating, even at lengths up to 15 inches. It is not intended, however, to limit the invention to these specific materials or dimensions, which are mentioned only by way of examples. Likewise, it is appreciated that a varying rate of energy absorption may be obtained by, for example, using a tube of tapered wall thickness, and that various other changes in the arrangement of the parts and their connecting means may be made, all within the spirit and scope of the invention as hereinafter claimed.

I claim:

1. An energy absorber consisting of a tube of ductile metal and circular cross-section, means axially supporting one end of the tube in thrust, the opposite end of said tube terminating with a smaller diameter portion turned inwardly and reversely of the remainder of said tube, and a rigid member connected to said opposite end for movement therewith axially of the tube toward said one end, the external periphery of said member facing the reversely turned portion of the tube during said movement.

2. An energy absorber consisting of a tube of ductile metal open at one end, said tube being of circular cross-section and having its opposite end turned radially inward and toward said open end, means axially supporting the tube at its open end against thrust axially of the tube, and a rigid member connected to said opposite end for movement therewith axially of the tube toward said open end, said member having its external surface radially facing the inward and axially turned end portion of the tube during said movement.

3. An energy absorber consisting of a tube of ductile metal and circular cross-section, one end of said tube being open and terminating with an external flange, the other end being bent radially inwardly and reversely of itself and a pair of members for applying axial thrust to said respective ends, one of said members being fixed to said flange and having a chamber extending axially thereof to receive the other member with said reversely bent tube end therebetween, said other member extending into said reversely bent tube end during its movement therewith toward and into the chamber.

4. An energy absorber comprising a tube of ductile metal and circular cross-section, one end of said tube having a flange extending generally radially thereof, two members movable toward each other axially of the tube to collapse the tube by reverse endwise bending of its side walls, one of said members being connected to said flange and having an annular wall surface extending axially of the tube from said flange, said wall surface and the radially opposite facing surface of the tube being of substantially different diameters to accommodate said bending of the tube side walls therebetween as said one member is moved toward the other of said members, said other member being connected to the tube at a distance axially thereof from said flange.

5. In a vehicle bumper mounting, a vehicle frame, a bumper in spaced protective relation to the frame, a tube of ductile metal and circular cross-section disposed endwise between the frame and bumper, one end of said tube having a flange extending generally radially thereof, and members on the frame and bumper movable toward each other axially of the tube in response to impact forces received by the bumper, one of said members being connected to said flange and having an annular wall surface extending axially of the tube from said flange, said wall surface and the radially opposite facing surface of the tube being of substantially different diameters to accommodate reverse endwise bending of the tube side walls between said surfaces as said one member is moved toward the other of said members, said other member being connected to the tube at a distance axially thereof from said flange.

References Cited in the file of this patent

UNITED STATES PATENTS

| | | |
|---|---|---|
| 1,439,209 | Watson | Dec. 19, 1922 |
| 1,649,841 | May | Nov. 22, 1927 |
| 2,144,357 | Booharin | Jan. 17, 1939 |
| 2,192,355 | Kuhn | Mar. 5, 1940 |
| 2,251,347 | Williams et al. | Aug. 5, 1941 |
| 2,553,237 | Camarero | May 15, 1951 |
| 2,776,695 | Wells | Jan. 8, 1957 |
| 2,811,385 | Butler | Oct. 29, 1957 |
| 2,837,176 | Dropkin | June 3, 1958 |
| 2,841,294 | Henrickson et al. | July 1, 1958 |
| 2,857,056 | Dilworth | Oct. 21, 1958 |
| 2,870,871 | Stevinson | Jan. 27, 1959 |

FOREIGN PATENTS

| | | |
|---|---|---|
| 446,174 | Germany | June 24, 1927 |
| 750,751 | Great Britain | June 20, 1956 |
| 752,017 | Great Britain | July 4, 1956 |